April 18, 1961     C. L. McCONNELL     2,979,848
BARBLESS FISH HOOK
Filed Jan. 2, 1959

INVENTOR:
CHARLES L. McCONNELL
BY Howson & Howson
ATTYS.

2,979,848
Patented Apr. 18, 1961

2,979,848
BARBLESS FISH HOOK
Charles L. McConnell, 12 S. Bacon St., Port Norris, N.J.

Filed Jan. 2, 1959, Ser. No. 784,805

2 Claims. (Cl. 43—37)

This invention relates to new and useful improvements in barbless fish hooks.

More particularly, the invention contemplates the provision of a barbless fish hook which is constructed and operable to prevent the escape of a fish caught thereon and which is also of a construction which will not tear the mouth of the fish and may be easily removed therefrom.

The invention consists in certain novel features of construction and arrangement, hereinafter fully set forth and shown in the accompanying drawing, in which.

Figure 2:
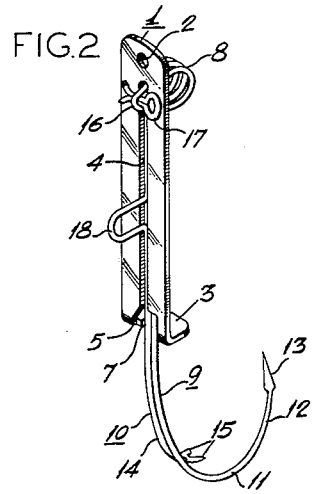
Figs. 1 and 2 are views in perspective, from the front and rear respectively, of a fish hook made in accordance with the present invention and showing the same with the hook and guard in retracted or inoperative positions.
Figure 1:
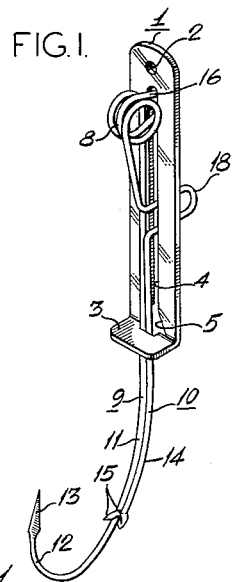

Referring now more particularly to the drawing, a barbless fish hook made in accordance with the present invention comprises a bracket or plate 1 having in its upper end an opening 2 for connection of the usual leader or fish line (not shown). At its lower end the bracket or plate 1 is provided with a forwardly extending flange portion 3 disposed at right angles to the plane of said bracket or plate. Formed in the bracket or plate 1 and extending longitudinally therein from the flange 3 to a point adjacent the upper end of the bracket is an elongated opening or slot 4. As shown more clearly in Fig. 4, the portions of the bracket 1 at the lower end of the slot 4 adjacent the flange 3 are cut-away as indicated at 5 and 6, respectively, and the adjacent inner edge of the said flange 3 is recessed or notched as indicated at 7 for a purpose hereinafter described.

Figure 7:
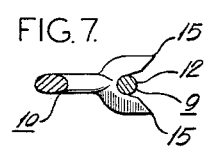
Fig. 7 is an enlarged fragmentary sectional view taken on line 7—7, Fig. 6.

Slidably mounted in the bracket or plate 1 is a fish hook and guard member comprising a length of suitable spring wire which is coiled for several turns intermediate its ends as indicated at 8 to provide a spring portion and then is doubled upon itself as shown to provide a hook 9 and a securing element or guard 10. The hook 9 has a shank 11 the free end of which is curved to form a bill 12 having at its extremity a barbless spur-like point 13. The guard 10 likewise has a shank portion 14 and its free end is provided with small lock spurs or points 15 which, in the extended operative portion of the guard 10, engage the hook bill 12 at opposite sides thereof just inwardly of its point 13, for example as shown in Fig. 7 of the drawing.

Figures 3, 4:
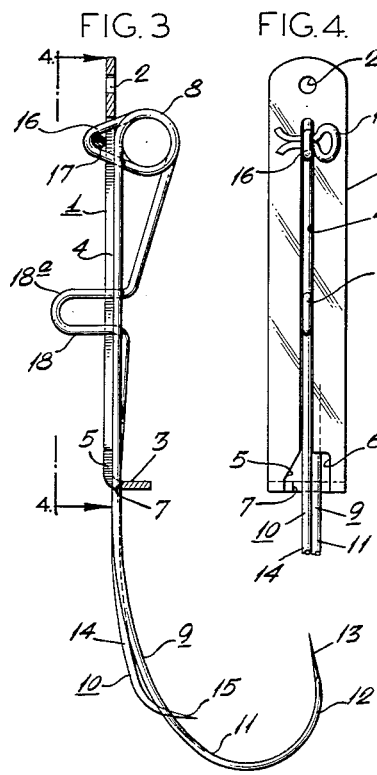
Fig. 3 is an enlarged side elevational view partially in section of the fish hook shown in Figs. 1 and 2.
Fig. 4 is a fragmentary rear elevational view taken on line 4—4, Fig. 3.
Figure 6:
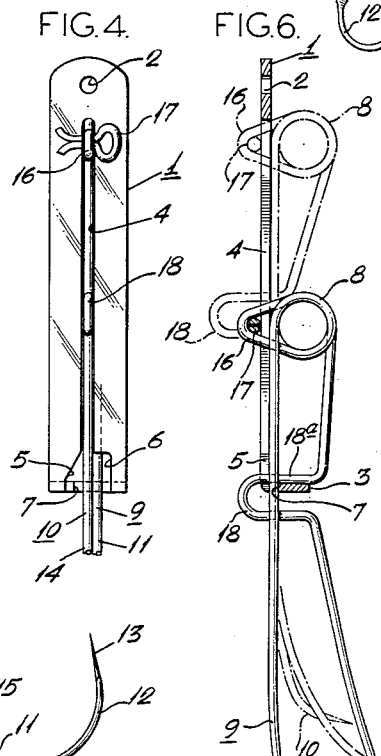
Fig. 6 is a view similar to Fig. 3 but showing the hook and guard in the extended operative position thereof.
Figure 5:
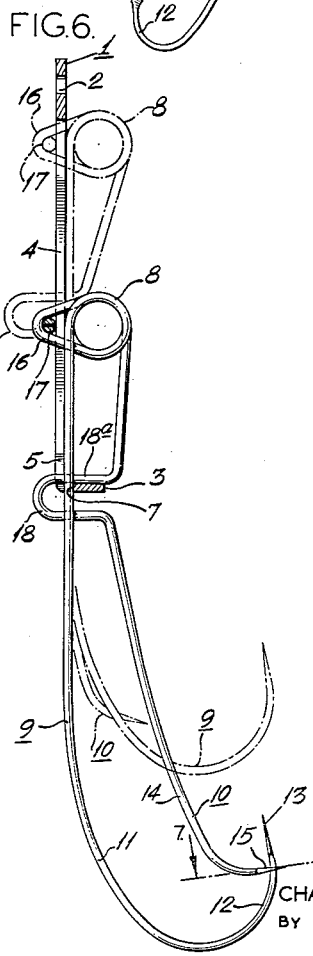
Fig. 5 is a front elevational view of the fish hook.

As shown more clearly in Figs. 2, 3 and 6 of the drawings, the intermediate turn of the coil 8 is formed to project or extend through the elongated slot 4 in the bracket 1, as indicated at 16, and a cotter pin or the like 17 is engaged through the coil loop at the rear side of the bracket 1 to secure the hook and guard member against displacement or disconnection from the bracket or plate 1 while permitting sliding movement thereof within the said slot 4.

In the retracted or inoperative position of the device shown, for example, in Fig. 3 of the drawing, the hook and guard member is disposed at its upper limit position in the slot 4 of the bracket 1, and the shank portions of the hook and guard extend longitudinally of and through said slot 4 rearwardly of the flange 3 and outwardly endwise of the bracket. As shown, the shank portions of the hook and guard are disposed in the notch 7 of the bracket flange 3 which thus retains the guard against the force of he spring coil 8 so that the lock points at its free end are held remote and disengaged from the bill of the hook.

As shown in the drawing, the shank portion 14 of the guard 10 is provided with a rearwardly projecting U-shaped portion 18 which is slidably received within the bracket slot 4. This portion 18 not only serves as a guard for sliding movement of the hook and guard member relative to the bracket 1, but also provides clearance for the bracket flange 3 when the member is moved into its extended operative position thereby releasing the guard and allowing the spring coil 8 to urge the lock points thereof into engagement with the bill of the hook in the relation shown in solid lines in Fig. 6. In this extended position of the hook and guard member the upper arm 18a of the U-shaped portion 18 moves into engagement with the upper surface of the flange 3 to provide a positive stop for the hook and guard member in the extended operative position of the latter.

When using the barbless fish hook of the present invention the hook and guard member is actuated to its retracted or inoperative position and the hook is then baited in the usual manner. When a fish is caught on the hook portion 9 the efforts of the fish to escape exert pull upon the hook and actuate the latter and its associated guard portion relative to the bracket 1 from the retracted position, shown in broken lines in Fig. 6, to the extended position shown in solid lines. As the member reaches the extended position clearance or recess provided by the U-shaped guard portion 18 releases the latter from the restraining action of the flange 3 and permits it to be urged outwardly by the spring coil 8. When thus released the lock points 15 of the guard 10 penetrate the mouth of the fish and in conjunction with the point 13 of the bill 12 securely hold the fish against possible escape. Also, when landed the fish may be easily and readily removed from the hook merely by compressing the guard 10 with the thumb and at the same time holding the hook 9 in such a position that the fish will fall from the pointed bill portion, a result easily accomplished due to the lack of any barbs thereon.

In addition to the features and advantages previously set forth herein, the fish hook construction of the present invention has other advantages and features not present in prior constructions. For example, the multiple coil spring 8 provides improved, more powerful and controllable spring action in the operation and use of the hook. Also, the construction of the bracket or plate 1 is such as to minimize the possibility of becoming fouled in the fish line or leader. Moreover, in the retracted position the guard is spaced the maximum distance from the hook bill. Furthermore, the cotter pin may readily be removed to detach the hook and guard member for better cleaning and repairing of the respective parts, or for the substitution of hooks of different size.

While a particular embodiment of the invention has been herein illustrated and described, it is not intended

I claim:

1. A fish hook comprising a bracket having an elongated flat plate portion and an integral laterally projecting flange at one end thereof and an elongated slot extending along the plate portion and into said flange, a member mounted for sliding movement on said bracket between a retracted inoperative position and an extended operative position, said member comprising a wire coiled and doubled to provide spring interconnected hook and guard portions extending longitudinally of and through said slot outwardly endwise of the said one end of the bracket and provided at their free ends respectively with a hook having a curved bill and a lock portion constructed for interengagement with said bill of said hook when in operative position, at least one spring coil of the member having a projected portion extending slidably within and through the slot in the plate portion of said bracket, means engaged through the projected portion of said spring coil to secure the same against displacement from said slot while permitting sliding movement of the same and said member longitudinally therein, the flange of the bracket being disposed so that in the retracted inoperative position of the member the flange will engage the guard portion and retain the lock portion thereof remote from the bill of the hook and the shank of the guard portion having a recess formed therein extending in a direction opposite the flange and disposed so that in the extended operative position of the member the flange is received within said recess thereby releasing the guard portion to engage the lock portion thereof with the bill of the hook.

2. A fish hook comprising a bracket having an elongated flat plate portion and an integral laterally projecting flange at one end thereof and an elongated slot extending along the plate portion and into said flange, a member mounted for sliding movement in said bracket between a retracted inoperative position and an extended operative position, said member comprising a wire coiled and doubled to provide spring interconnected hook and guard portions extending longitudinally of and through said slot outwardly endwise of the said one end of the bracket and provided at their free ends respectively with a hook having a curved bill and a lock portion constructed for interengagement with said bill of said hook when in operative position, at least one spring coil of the member having a projected portion extending slidably within and through the slot in the plate portion of said bracket, means engaged through the projected portion of said spring coil to secure the same against displacement from said slot while permitting sliding movement of the same and said member longitudinally therein, the flange of the bracket being disposed so that in the retracted inoperative position of the member the flange will engage the guard portion and retain the lock portion thereof remote from the bill of the hook, the flat plate portion engaging the hook in both positions on the side of the plate having the flange and the shank of the guard portion of the member being formed so that it contains a U-shaped offset extending in a direction opposite to the flange thereby providing clearance for the bracket flange upon movement of the member to its extended operative position thereby permitting said U-shaped offset of said guard portion to slip over the flange and thereby allow the guard portion of the member to spring towards the bill of the hook portion and engage the lock portion of the guard with the bill of the hook.

References Cited in the file of this patent
UNITED STATES PATENTS 2,176,820    McConnell _____ Oct. 17, 1939